(12) United States Patent
Rusinov et al.

(10) Patent No.: US 8,778,244 B2
(45) Date of Patent: Jul. 15, 2014

(54) METHOD OF PRODUCING A FILTERING CARTRIDGE

(75) Inventors: Gleb Dmitrievich Rusinov, Saint Petersburg (RU); Alexey Leonidovich Kuzmin, Saint Petersburg (RU); Alexander Ivanovich Andreev, Saint Petersburg (RU); Joseph Lvovich Shmidt, New York, NY (US); Vitaliy Stephanovich Samko, Saint Petersburg (RU); Pavel Alexandrovich Hubov, Saint Petersburg (RU)

(73) Assignee: Electrophor, Inc., Woodmere, NY (US)

( * ) Notice: Subject to any disclaimer, the term of this patent is extended or adjusted under 35 U.S.C. 154(b) by 226 days.

(21) Appl. No.: 12/920,369

(22) PCT Filed: Mar. 2, 2009

(86) PCT No.: PCT/RU2009/000100
§ 371 (c)(1),
(2), (4) Date: Aug. 31, 2010

(87) PCT Pub. No.: WO2009/145660
PCT Pub. Date: Dec. 3, 2009

(65) Prior Publication Data
US 2011/0000841 A1 Jan. 6, 2011

(30) Foreign Application Priority Data
May 29, 2008 (RU) ................................ 2008121728

(51) Int. Cl.
*B29C 45/14* (2006.01)

(52) U.S. Cl.
USPC .. 264/153; 263/257; 263/328.1; 263/DIG. 48

(58) Field of Classification Search
USPC ......... 210/282, 283, 291, 293, 460, 464, 483, 210/484, 495; 264/153, 257, 328.1, DIG. 48
See application file for complete search history.

(56) References Cited

U.S. PATENT DOCUMENTS

| | | | |
|---|---|---|---|
| 4,774,058 A * | 9/1988 | Mehl | 210/266 |
| 4,900,441 A * | 2/1990 | Graus et al. | 210/321.84 |
| 5,002,665 A | 3/1991 | Brueggemann | |
| 5,049,272 A | 9/1991 | Nieweg | |
| 5,652,008 A | 7/1997 | Heiligman | |

(Continued)

FOREIGN PATENT DOCUMENTS

| RU | 225 U1 | 1/1995 |
|---|---|---|
| RU | 3693 U1 | 3/1997 |

*Primary Examiner* — Matthew O Savage
(74) *Attorney, Agent, or Firm* — Arent Fox LLP; Michael Fainberg

(57) ABSTRACT

Disclosed are filtering cartridge and methods of producing the filtering cartridge for purifying drinking water and other liquids for household, medical and other purposes. A filter cartridge is filled with a filtering material and is configured in the form of an open bowl which can be closed with a lid, having side walls and a bottom with at least one outlet opening which is closed with a water-permeable material, wherein the cartridge bottom is designed such as to make it possible to use the water-permeable material which comes to the external edge of the side walls and is made of fibers with a sufficiently small diameter to allow using the filtering material containing powder particles; furthermore, the entire area between external and internal edges of the walls along the perimeter of the bottom is made of a composite based on a polymer water-permeable material.

13 Claims, 9 Drawing Sheets

(56) References Cited

U.S. PATENT DOCUMENTS

| | | | |
|---|---|---|---|
| 5,885,499 A * | 3/1999 | Aksberg | 264/153 |
| 6,012,232 A | 1/2000 | Weyrauch | |
| 6,099,728 A | 8/2000 | Bairischer | |
| 6,887,413 B1 | 5/2005 | Schumacher | |
| 8,012,349 B2 * | 9/2011 | Bowers | 210/282 |
| 2008/0128346 A1 * | 6/2008 | Bowers | 210/193 |

* cited by examiner

METHOD OF PRODUCING A FILTERING CARTRIDGE

CROSS-REFERENCE TO RELATED APPLICATION

This application is a National Stage entry of International Application No. PCT/RU2009/000100, filed Mar. 2, 2009 which claims the benefit of priority from Russian Application No. 2008/121728 filed May 29, 2008. The disclosures of the prior applications are hereby incorporated herein in its entirety by reference.

FIELD OF THE INVENTION

The group of inventions relates to filtering devices for liquid purifying, substantially drinking water, assigned for using in filters for liquid purifying under household conditions, substantially in jar type filters and can be used for purifying drinking water and other liquids for household applications, in medical and other fields.

BACKGROUND

From the prior art, it is known a device for water filtering (U.S. Pat. No. 5,002,665, published on 26 Mar. 1991, IPC B01D24/00), the device includes a filtering insertion (1) filled with a filtering material and made in the form of a bowl which can be closed with a lid (3) having outlet openings (5) in its bottom part, the openings being closed from above with a mesh (9) of low-melting plastic fibers which can be welded to the bottom (pages 1, 2 of the specification; FIGS. 1, 2). This device is difficult enough to produce and has a small flow area, which results in decreasing filtration speed.

It is known a filtering unit for liquid purifying, the filtering unit comprises a case (2) made in the form of a bowl with side walls and a bottom (6) with outlet openings (9), and a lid with holes for liquid inlet. A granulated filtering material is placed in the case. To prevent the filtering material to get into purified liquid, a mesh (8) made in the form of a flat disk and welded to the bottom is placed between said material and the bottom. The mesh is made of a nonwoven fabric, for example, polypropylene (page 1 of the specification; FIG. 2), (U.S. Pat. No. 5,049,272, published on 17 Sep. 1991, IPC B01D24/14). At production of said unit it is necessary additionally to fix the mesh to the unite basis.

From the U.S. Pat. No. 6,012,232 published on 11 Jun. 2000, IPC F26B19/00, it is known a filtering unit filled with a filtering material, the filtering unit comprises side walls, a lid and a bottom with outlet openings closed with a mesh. The material, which the mesh is made of, comprises two types of fibers connected together: hydrophilic and hydrophobic fibers (page 3 of the specification). Due to a small flow area, it is impossible to achieve high filtration speed, which decreases operating performances of a product.

The closest analogue of the present invention is a filtering cartridge (1) known from the U.S. Pat. No. 6,099,728, published on 8 Aug. 2000, IPC B01D27/02, wherein the filtering cartridge filled with a granulated filtering material and made in the form of an open bowl that can be closed with a lid, and has side walls (3) and a bottom (1) with outlet openings (2) closed with a fabric insertion (12) having a plastic frame (11) (page 2 of the specification, FIGS. 1, 2), wherein the size of cells is from 50 to 300 microns, preferably 80-200 microns (page 1 of the specification). The outlet openings located in the bottom of said cartridge have a restricted flow area, which leads to decreasing filtration speed, i.e. to deterioration of operating performances of a product. At production of said cartridge, a separately dedicated stage of production is required, in which the insertion with a plastic frame is formed. The already produced insertion is used at manufacture of the cartridge itself by a method of injected moulding. Multiple stages of production process complicate techniques of producing a filtering cartridge. Methods of producing filtering means or their elements from plastics which are known from the prior art are generally based on a method of injected moulding under pressure. However, the main problem of producing filtering means arises at use of fiber materials, for example, nonwoven materials with a small fiber diameter, for example, 2-20 microns. The possibility of using said materials as a part of filtering devices allows applying a smaller sorbent in liquid purifying means, for example, a powder-like filtering material with the size of particles less than 50 microns, which in turn leads to heightening purification degree of filtered liquid. However, at an automized piece cutting from such materials, it is necessary to ensure that clearances in a cutting stamp is much less than diameters of fibers, which is not possible in the prior art. Other methods of obtaining such products consist in using clinking dies, ultrasonic and laser cutting and cutting with a hot instrument. All these methods do not ensure steady automatic operation.

The closest analogue for a method of producing a filtering cartridge according to the present invention is a method of producing a shell or a part of fashioning with directly cast fastening element known from the U.S. Pat. No. 6,887,413, published on 3 May 2005, IPC B29C45/14, comprising the steps of: placing a blank which represents a decorative part with a layer of wood veneer, or a part of sheet metal, or a nonwoven coverage on a substrate, etc., in at least a split mould for moulding under pressure, closing a mould and thus providing excising (cutting down) of a piece from a blank to reach an exact form, than filling a shaping cavity of the mould with a melted composition for casting by an injection method under pressure and, after hardening of a composition, extracting a product from the mould. In said method, the use of fiber materials with a small fiber diameter as a blank leads to a problem of cutting down of the blank.

SUMMARY

The general object of the proposed group of inventions is creation of a safe construction with high operating performances at simplification of techniques of producing a product.

The technical effect from the use of the proposed group of inventions consists in heightening liquid filtration speed by increasing a flow area and simultaneously by heightening liquid purification efficiency.

The posed object and the required technical effect are achieved by that:

in a filtering cartridge filled with a filtering material, configured in the form of an open bowl which can be closed from above with a lid, and having side walls and a bottom with at least one outlet opening closed at least with one water-permeable material according to the invention, the bottom is configured to use the water-permeable material extending to the external edge of the side walls and made of fibers with a sufficiently small diameter to allow using the filtering material including powder-like particles, the entire area between external and internal edges of the walls along the perimeter of the bottom representing a composite based on a polymer water-permeable material;

the water-permeable material is used, the material comprising fibers thicker than 0.5 micron in diameter, preferably 2-20 microns;

the water-permeable material is used, the material having thickness from 0.02 mm to 3 mm, preferably from 0.04 mm to 2 mm, and more preferably from 0.05 mm to 0.3 mm;

the water-permeable material is used, the material being made of one of polyester fibers, polyolefin fibers, polyamide fibers and microfibers;

the water-permeable material can be made in the form of a corrugated material;

the water-permeable material can be made of at least two layers, wherein at least one of layers is made of a material with defined properties, for example, one of a germicide material, a sorption material and an ion-exchange material;

the bottom can be made with reinforcing ribs;

the reinforcing ribs represent a composite of a polymer water-permeable material;

the enforcement ribs can be radial directed;

the enforcement ribs can be convex-shaped;

the water-permeable material arranged between the enforcement ribs can be convex-shaped, wherein the water-permeable material arranged between the enforcement ribs can have a surface area bigger than the cross-section area between the enforcement ribs;

the filtering material can comprise powder-like and fiber particles, wherein the filtering material can comprise particles with the size less than 50 microns;

in a method of producing a filtering cartridge comprising placing a blank in at least a split mould, cutting the blank to obtain the given shape of a piece, filling a shaping cavity of the mould with melted polymer and extracting a product from the mould, wherein, according to the invention, filling the shaping cavity of the mould with the melted polymer is conducted upon placing the blank, and the cutting is performed in a cutting zone which is moulded in the purpose-made region of the mould, wherein cutting and extracting the product are performed simultaneously;

the blank edges extend out of limits of the cutting edge, and the cutting zone represents a composite of the blank and the melted and then hardened polymeric material, wherein the cutting zone can be moulded from one side of the blank or can be moulded from two sides of the blank in such a way that the blank is alloyed between polymer layers;

the blank represents a continuous belt of the water-permeable material with a sufficiently small fiber diameter to allow using the filtering material including powdered particles;

the water-permeable material is used with fibers of the diameter higher than 0.5 micron, preferably 2-20 microns;

the water-permeable material is used with thickness from 0.02 mm to 3 mm, preferably from 0.04 mm to 2 mm, and more preferably from 0.05 mm to 03 mm;

the water-permeable material is used, the material being made of one of polyester fibers, polyolefin fibers, polyamide fibers and microfibers;

the belt of the water-permeable material is moved automatically upon each cycle of filling the shaping cavity of the mould with the melted polymer and cutting;

said filtering cartridge produced according said method is applied in a liquid, substantially drinking water, purifying device.

BRIEF DESCRIPTION OF THE DRAWINGS

Essence of the group of inventions is specified by the drawings.

DETAILED DESCRIPTION

Figure 1:
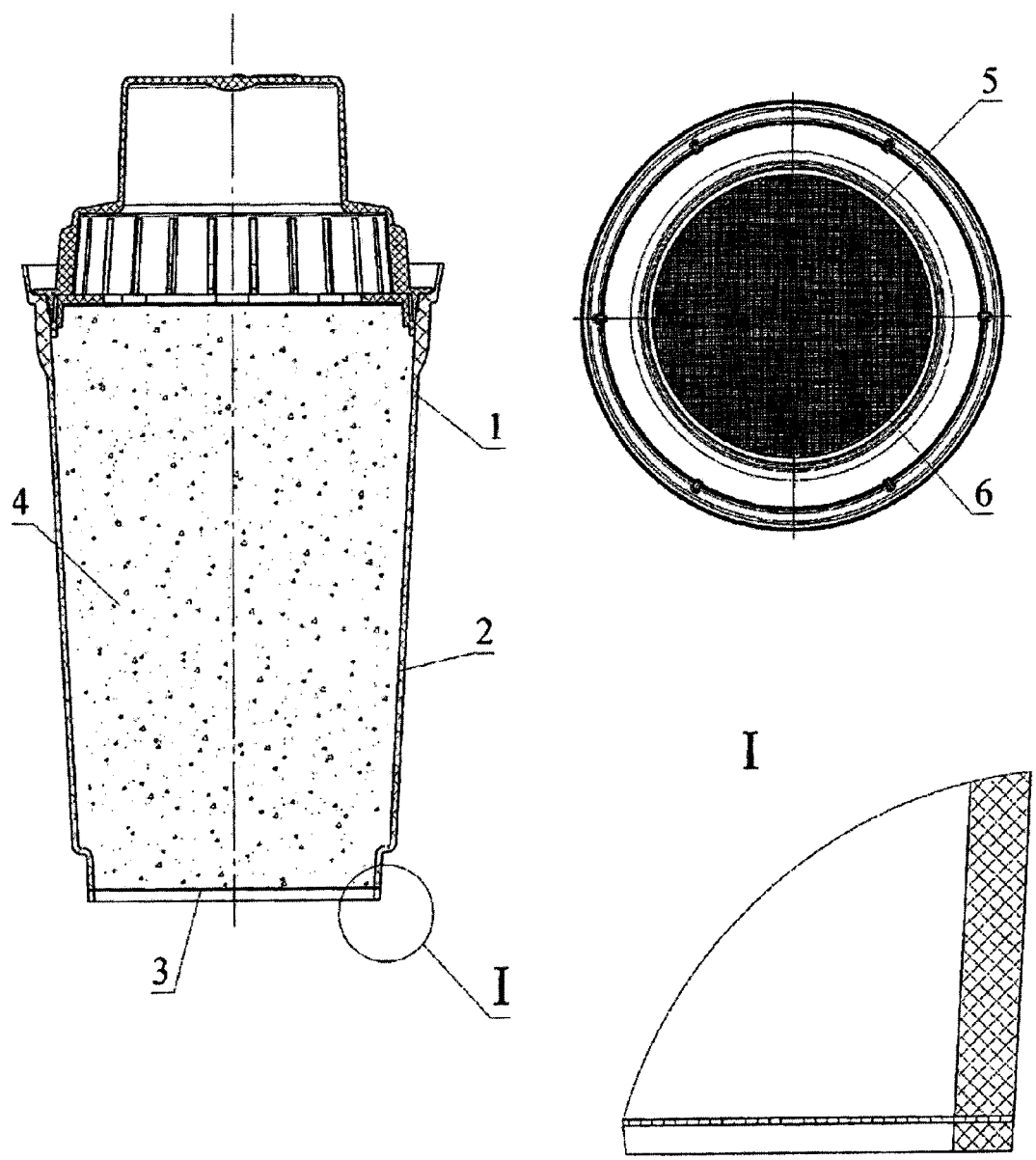
FIG. 1 is a general view and a bottom view of a filtering cartridge, in which side walls are designed as a cylindrical surface.

The essential feature of the claimed filtering cartridge consists in that the bottom is made of the water-permeable material that comes to the external edge of side walls and made of fibers having a sufficiently small diameter by means of the claimed method. The use of the water-permeable material made of thin fibers allows providing high gas permeability and water permeability of the output filter, which is the bottom of the filtering cartridge, due to increasing a total flow area, i.e. to raise liquid filtration speed and, further, to apply a smaller sorbent in the filtering cartridge, for example, activated powdered carbon with the size of particles less than 50 microns (preferably 20 microns and less), which in turn leads to increasing the degree of purification for filtered liquid.

The filtering cartridge 1 (FIG. 1) made in the form of a bowl and filled with the filtering material 4 consists of the side walls 2, which can be made, for example, in the form of a cylindrical surface (FIG. 1) or in the form of a cylindrical surface with a V-shaped groove 7 (FIG. 2) served to fix the filtering cartridge in a receiving container for purified water and the bottom 3.

Figure 2:
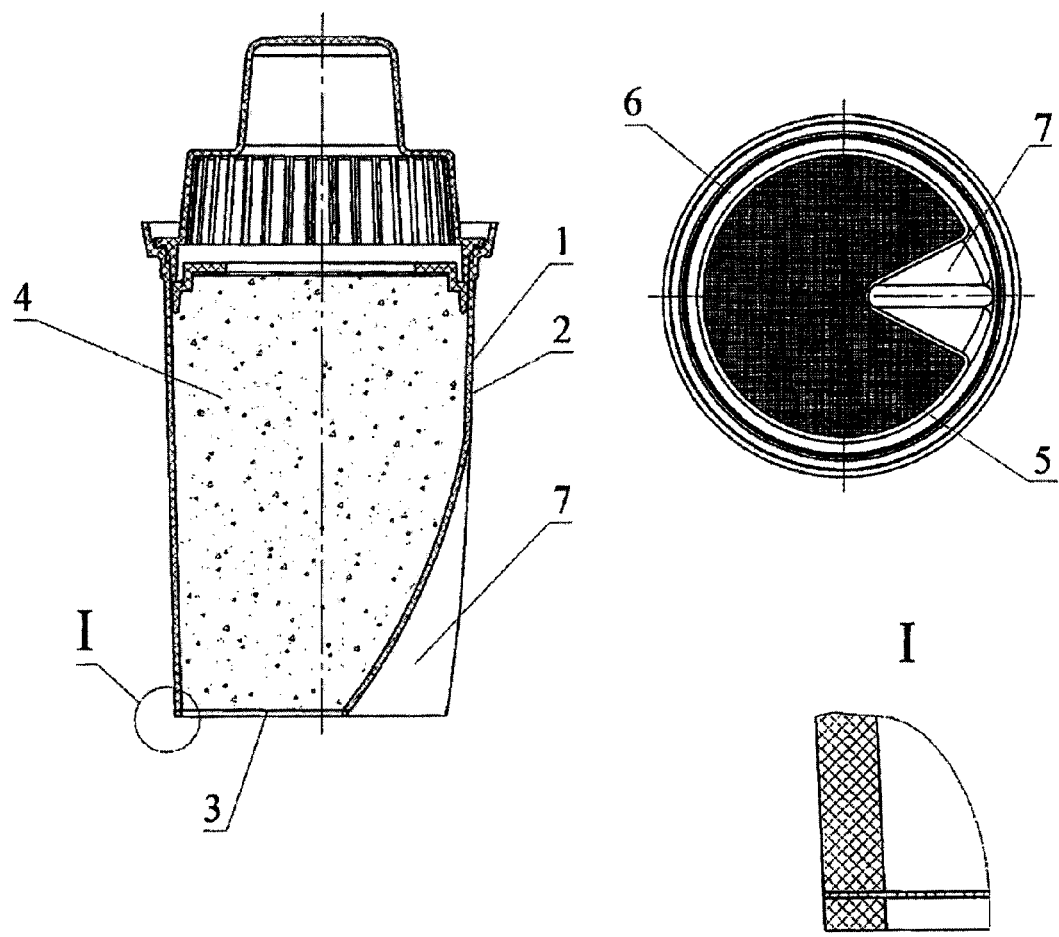
FIG. 2 is a general view and a bottom view of a filtering cartridge, in which side walls are designed as a cylindrical surface having a V-shaped groove.
Figure 6:
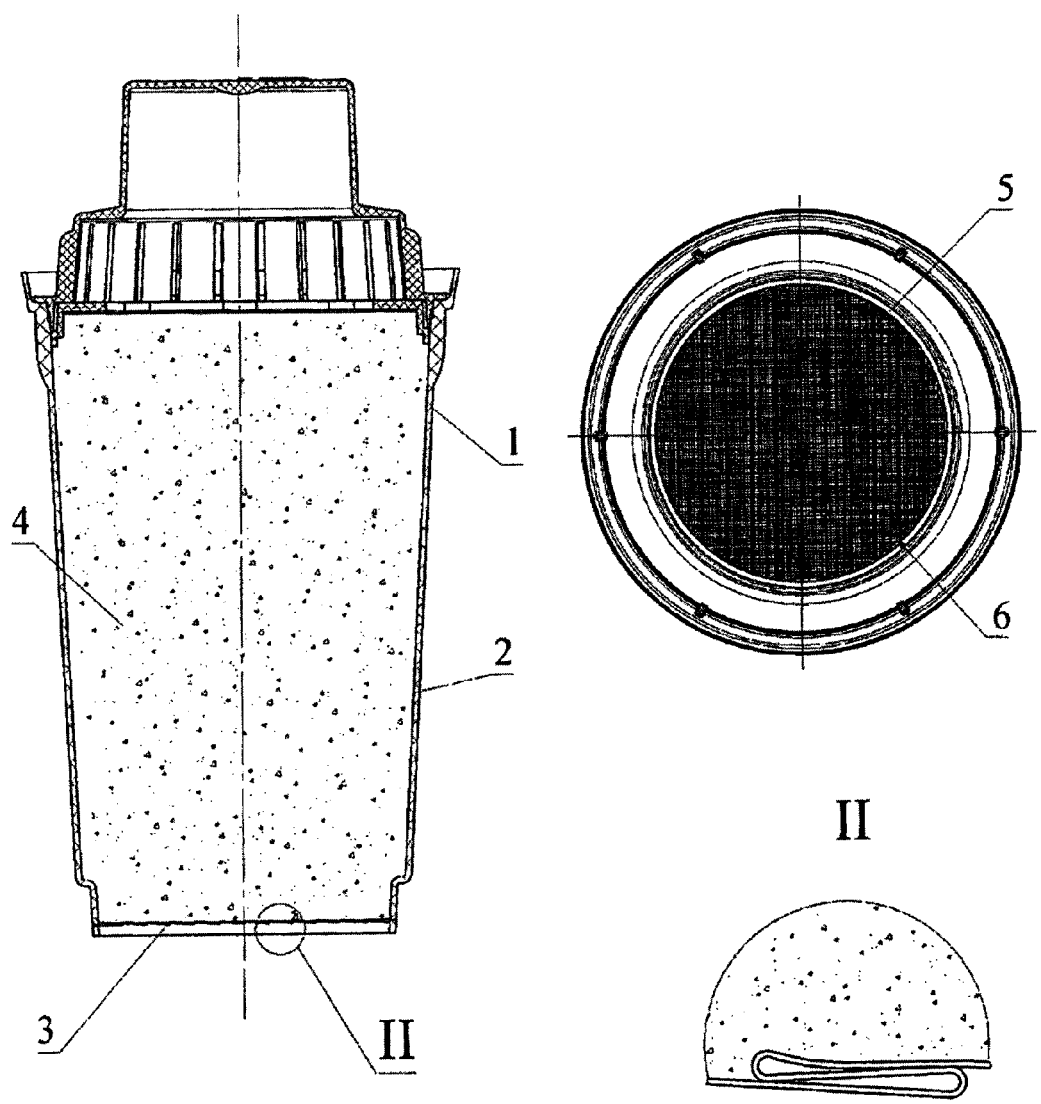
FIG. 6 is a general view and a bottom view of a filtering cartridge, in which a water-permeable material is designed as a riffled material.

To increase liquid filtration speed due to increasing the flow area, the bottom 3 of the filtering cartridge 1 is fully made of the water-permeable material 5 made of fibers with a sufficiently small diameter, the material coming to the external edges of the side walls 2 so that the area 6 between the external and internal edges of the side walls 2 represents a composite of a polymer water-permeable material 5 (view I, FIG. 1). As the water-permeable material 5 passing water and intercepting particles, a nonwoven material of polypropylene or similar is used, for example, with the diameter of fibers 10 microns, or a woven material is used, for example, a mesh of polyester fibers with fiber thickness 0.3 mm and fiber diameter 20 microns. The bottom 3 of the filtering cartridge 1 can be made of a flat water-permeable material 5 (FIGS. 1, 2) or a corrugated water-permeable material 5 (more thin or compressible material is used) (FIG. 6). The water-permeable material 5 can be made, for example, of several layers, which allows decreasing hydraulic resistance and, as consequence, increasing liquid flow speed, and, besides, at least one of layers can be made of a material with defined properties, for example, a germicide material, a sorption material or an ion-exchange material.

Figure 3:
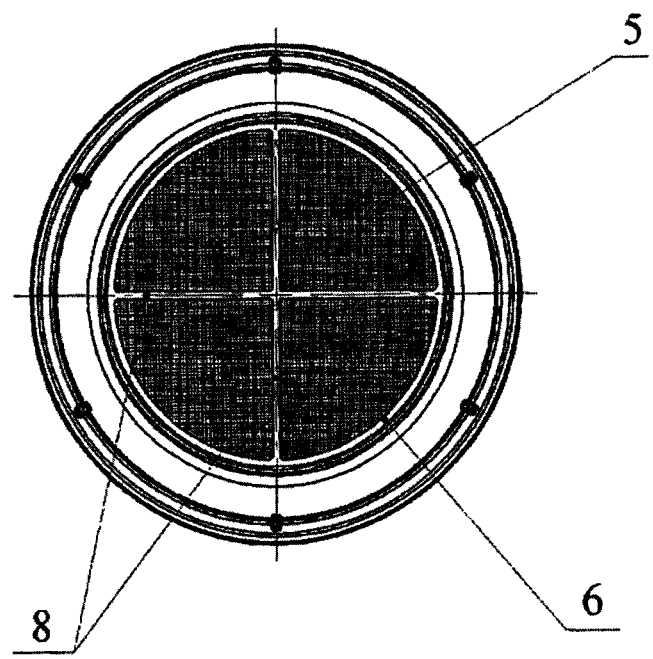
FIG. 3 is a bottom view of a filtering cartridge, in which reinforcing ribs are radially directed, and side walls are designed as a cylindrical surface.
Figure 4:
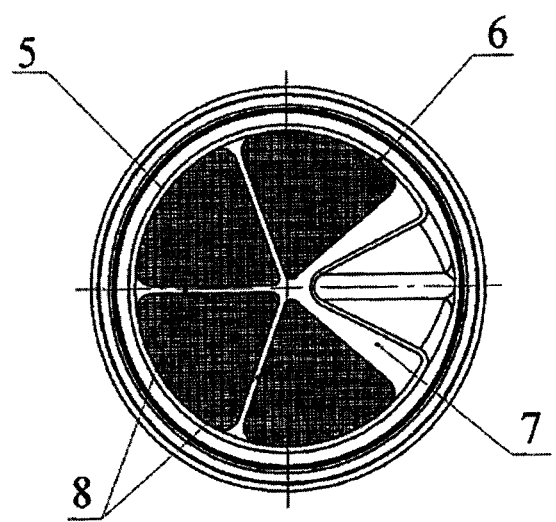
FIG. 4 is a bottom view of a filtering cartridge, in which reinforcing ribs are radially directed, and side walls are designed as a cylindrical surface having a V-shaped groove.
Figure 5:
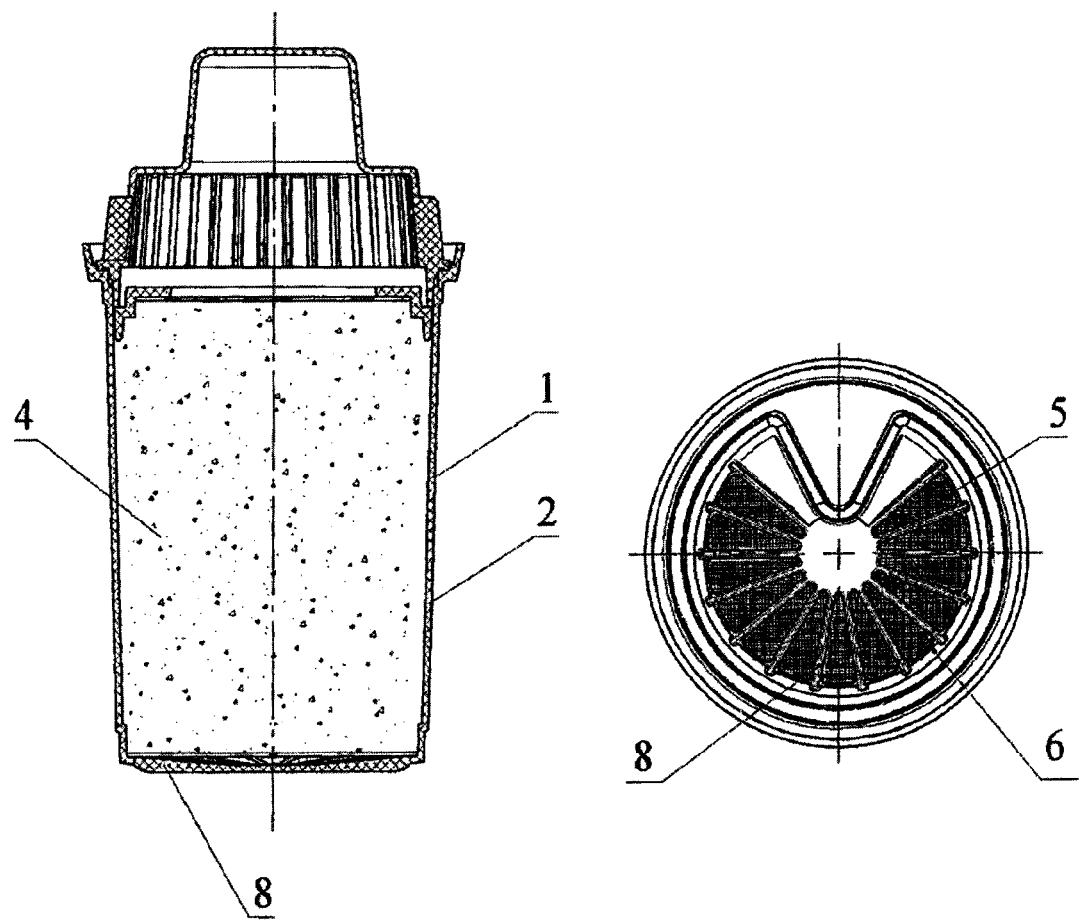
FIG. 5 is a general view and a bottom view of a filtering cartridge, in which reinforcing ribs are arranged along a conic surface.

The bottom 3 of the filtering cartridge 1 can have reinforcing ribs 8 which allow protecting the water-permeable material from casual mechanical effect and, at big sizes of the filtering cartridge 1, to ensure reliability of the construction. At the same time, the flow area between the reinforcing ribs is much more than the flow area from the closest analogue, including due to the reinforcing ribs 8 having a smaller size. The reinforcing ribs 8 represent (also as well as the area 6 between the external and internal edges of the walls 2 along the perimeter of the bottom 3) a composite of a polymer water-permeable material 5 being a stronger material. In this respect, the reinforcing ribs 8 occupy a smaller surface area of the bottom 3 of the filtering cartridge 1 than the flow area formed by the water-permeable material. The reinforcing ribs 8 can be made, for example, radial-shaped (FIGS. 3, 4) or arranged along a conic surface (FIG. 5).

Figure 7:
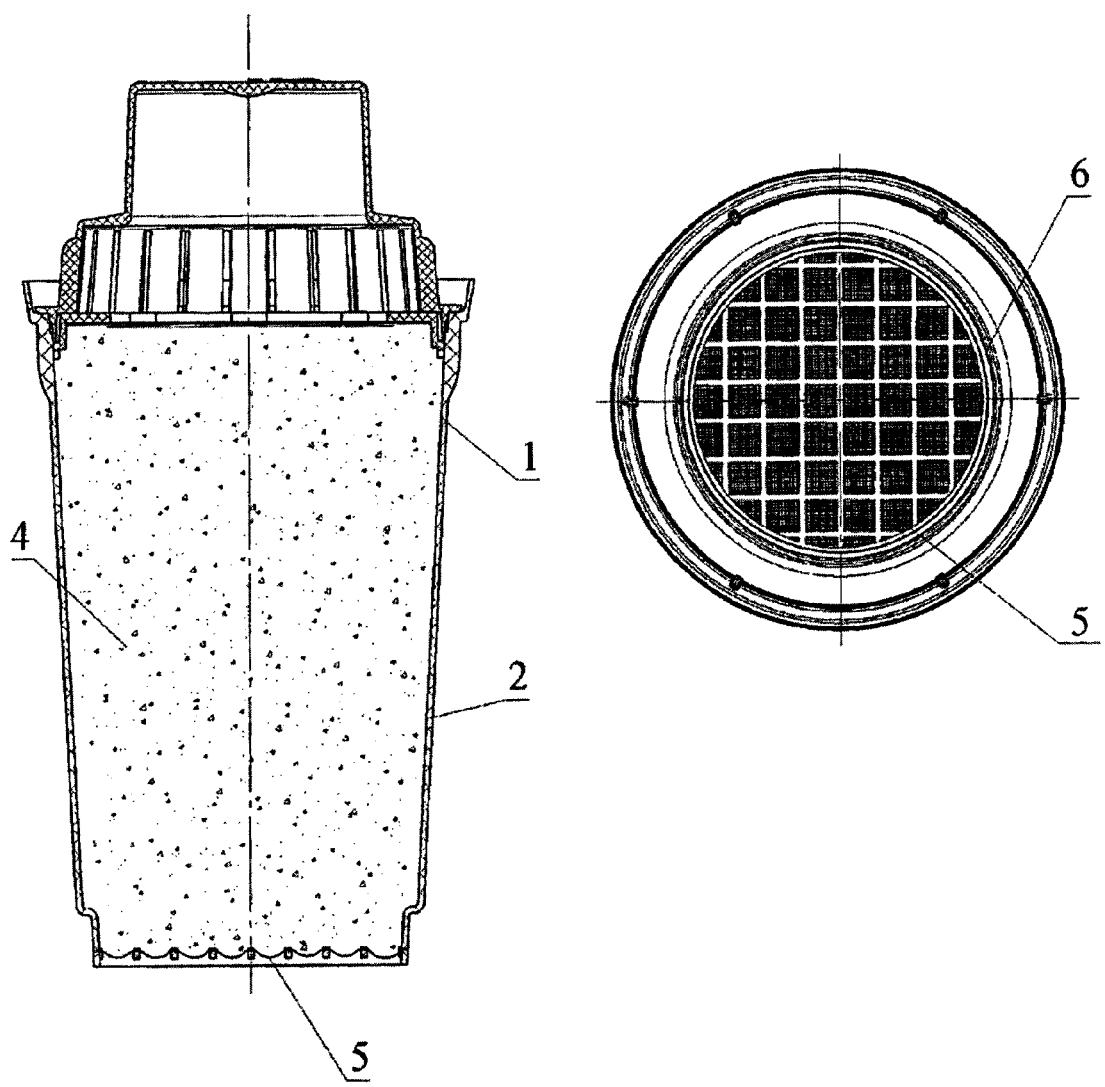
FIG. 7 is a general view and a bottom view of a filtering cartridge, in which the water-permeable material arranged between reinforcing ribs has a surface area bigger than the cross-section area between the reinforcing ribs.

The water-permeable material 5 arranged between the reinforcing ribs 8 can have a greater surface area than the cross-section area between the ribs, as shown in FIG. 7. Since the water-permeable material is easily formed, the folds of material are formed inevitably between closed halves of a mould, the folds being filled with a polymeric material, i.e. sites of the polymeric material are formed between convex parts of the water-permeable material, which also allows, due to increasing the flow area, increasing liquid filtration speed.

As a filtering material 4, it is used, for example, activated carbon granulated particles (activated granulated carbon) and/or ion-exchange polymeric granules (ion-exchange resin) and powder-like particles with the size less than 50 microns (activated powder-like carbon with the size of particles 20 microns and less), and/or fibrous particles with the diameter of fibers less than 50 microns (ion-exchange polymeric fibers, for example, ion-exchange polyacrylonitrile fibers with fiber diameter of 15-20 microns).

The filtering cartridge 1 can be closed from above with a lid 9.

The filtering cartridge can be used in a device for liquid purification, substantially water, for example, in a jar type filter.

Figure 8:
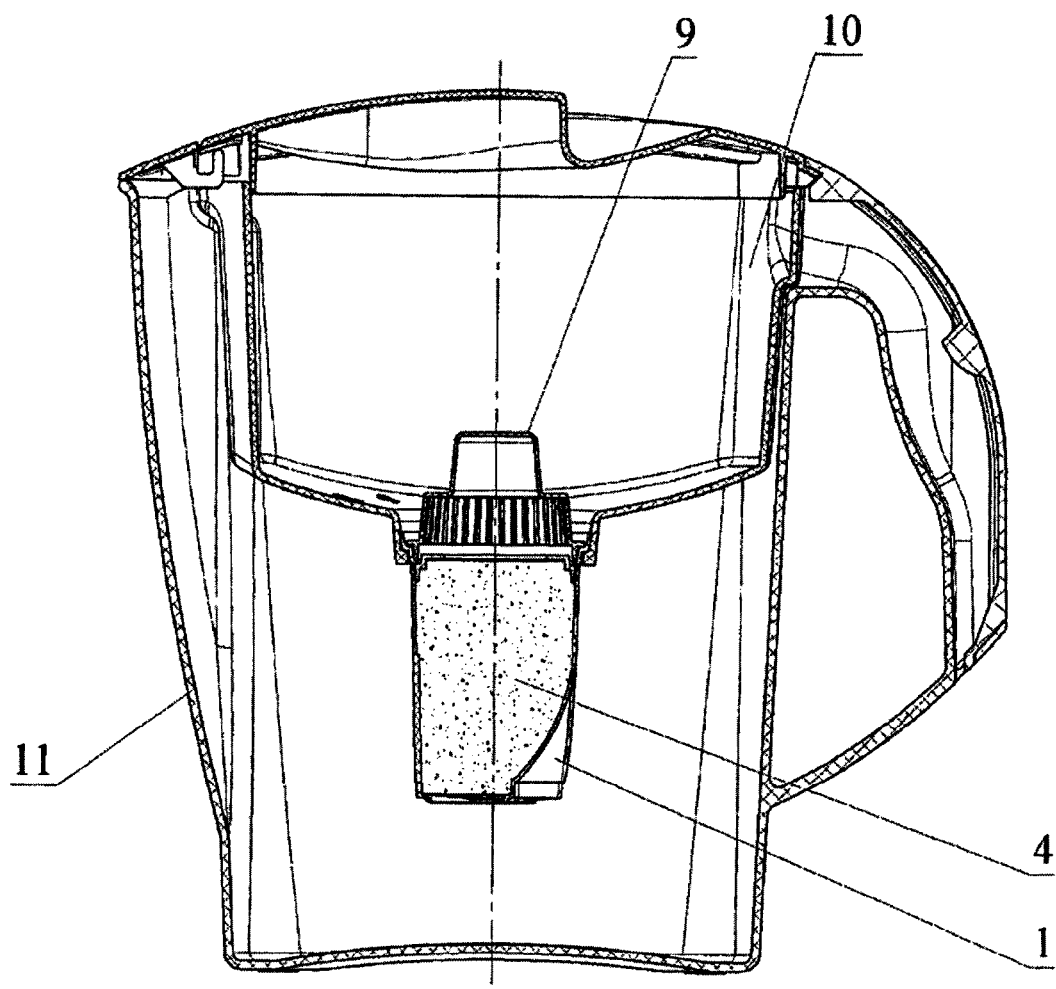
FIG. 8 is a general view of a jar type filter with a filtering cartridge arranged inside.

The filtering cartridge and the device for purifying liquid, for example, water, operates as follows: the filtering cartridge 1 filled with the filtering material 4 and closed with the lid 9 is inserted in a receiving container 10 for water to be purified (FIG. 8).

The receiving container 10, designed in the form of a funnel with the filtering cartridge 1, is inserted in the container 11 made in the form of a jar for purified water. At the beginning of a filtering process, water is filled in the receiving container 10. Raw water flows, through openings in the lid 9, in the filtering cartridge 1 and passes through the filtering material 4, whereupon purified water passes through the bottom 3 of the filtering cartridge and comes to the container 11, wherein small particles of the filtering material (sorbent) do not get to the purified water. The purified water can be poured out by inclining the device for water purifying.

Figure 9:
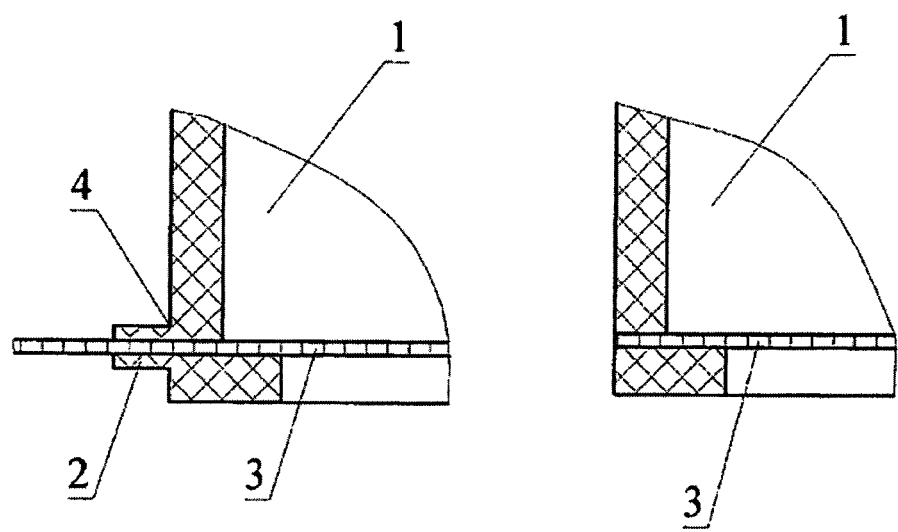
FIG. 9 is a diagram of a mould.

Essence of a method of producing a filtering cartridge by a technique of injected moulding under pressure consists in that a blank 3 is placed in a split mould 1 (FIG. 9) in which an area 2 is formed, wherein the blank 3 can represent, for example, a water-permeable material with the diameter of fibers higher than 0.5 micron, for example, a nonwoven material—polypropylene or like with the diameter of fibers 10 microns, or a woven material, for example, a mesh of polyester fibers with the diameter of fibers 20 microns and thickness 0.3 mm.

The mould 1 is closed and filled with a melted polymer (for example, polypropylene or polyethylene) by the technique of injection under pressure. Upon the operation of filling the mould 1 and hardening the polymer, cutting a piece is immediately conducted along a cutting zone 4 to the given shape. The operation of cutting a piece up to the given shape and the operation of extracting a finished product are combined and carried out simultaneously. The blank 3 (belts of a water-permeable material) moves automatically upon each cycle of filling the shaping cavity of the mould 1 with the melted polymer and cutting.

The area 2 in the mould 1 is formed by ledges (with thickness, for example, 0.2-0.6 mm) of shape-making elements of the mould being in contact with the blank 3, which allows realizing a process of cutting a piece along the zone 4 by using the blank made of the water-permeable material with a sufficiently small fiber diameter.

In the course of moulding, the melted polymer, in separate elements of the piece, for example, the cutting zone, the reinforcing ribs, the area between the external and internal edges of the side walls, can cover the blank 3 from one side or cover it from two sides due to making said ledges of shape-making elements of the mould either from one side or two sides of the blank 3.

The sequence of accomplishing the operation of cutting a piece upon the operation of filling the mould by the melted polymer allows realizing a process of cutting a piece. The combination of change in the sequence of operation accomplishing and forming the cutting zone in the purpose-made region of the mould provides a possibility to treat the water-permeable material with a sufficiently small fiber diameter and different fiber thickness within the ordered sizes, and the combination of operations of cutting a piece and extracting a finished product allows simplifying producing technique.

What is claimed is:

1. A method of producing a filtering cartridge, comprising;
   providing a split mould having a shaping cavity for forming a side wall of the filtering cartridge, said sidewall having an external peripheral surface and a bottom end, said bottom end having an opening;
   placing a blank in the shaping cavity of said split mould of the cartridge in a position to cover said opening upon formation of the sidewall, wherein the blank is a continuous belt of a water-permeable material;
   filling a said shaping cavity of the mould with a melted polymer after the step of placing the blank in the cavity of the mould followed by hardening the molten polymer to form the side wall of the cartridge, wherein the polymer of the sidewall alloys with the blank;
   cutting the blank to a shape that substantially covers the opening in the bottom of the cartridge after the step of hardening the molten polymer, whereby the cut blank extends to an external peripheral surface of the side wall of the cartridge; and
   extracting the cartridge, from the mould.

2. The method of claim 1, wherein steps of cutting and extracting the cartridge are conducted substantially simultaneously.

3. The method of claim 1, wherein at least one edge of the blank extends beyond the external peripheral surface of the side wall of the cartridge, and the cutting includes cutting a composite of the blank and a hardened polymer along a cutting zone.

4. The method of claim 3, wherein the cutting zone is located on one side of the blank.

5. The method of claim 4, wherein the cutting zone is molded on two sides of the blank in such a manner that the blank is alloyed between polymer layers.

6. The method of claim 1, wherein the water-permeable material includes a material with sufficiently small fiber diameter to allow using a filtering material including powdered particles.

7. The method of claim 1, wherein the water-permeable material comprises fibers with the diameter higher than 0.5 micron.

8. The method of claim 7, wherein the water-permeable material comprises fibers with the diameter from 2 microns to 20 microns.

9. The method of claim 1, wherein the water-permeable material has thickness from 0.02 mm to 3 mm.

10. The method of claim 9, wherein the water-permeable material has thickness from 0.04 mm to 2 mm.

11. The method of claim 10, wherein the water-permeable material has thickness from 0.05 mm to 0.3 mm.

12. The method of claim 1, wherein the water-permeable material is made of one of polyester fibers, polyolefin fibers, polyamide fibers and microfibers.

13. The method of claim 1, wherein the belt of the water-permeable material is automatically moved upon completion of the steps of filling, hardening, cutting and extracting.

* * * * *